(12) United States Patent
Ganti (10) Patent No.: US 7,934,681 B1
(45) Date of Patent: May 3, 2011

(54) QUICK CONNECT-DISCONNECT AIR TRANSPORT

(76) Inventor: Sastry Ganti, Buffalo Grove, IL (US)

( * ) Notice: Subject to any disclaimer, the term of this patent is extended or adjusted under 35 U.S.C. 154(b) by 0 days.

(21) Appl. No.: 12/925,346

(22) Filed: Oct. 21, 2010

Related U.S. Application Data (60) Provisional application No. 61/339,712, filed on Mar. 9, 2010.

(51) Int. Cl.
*B64D 1/12* (2006.01)
(52) U.S. Cl. ............... 244/137.4; 294/82.26; 294/82.24; 414/592
(58) Field of Classification Search ............... 244/137.4; 294/82.26, 82.24; 414/592
See application file for complete search history.

(56) References Cited

U.S. PATENT DOCUMENTS

| | | | |
|---|---|---|---|
| 3,602,544 A * | 8/1971 | Marsh | 294/74 |
| 4,090,567 A | 5/1978 | Tomlinson | |
| 4,640,328 A | 2/1987 | Arney | |
| 4,993,665 A | 2/1991 | Sparling | |
| 5,499,785 A * | 3/1996 | Roberts et al. | 244/137.4 |
| 6,688,402 B1 | 2/2004 | Wise | |
| 2010/0018725 A1 | 1/2010 | Ramos Rodriguez | |

* cited by examiner

*Primary Examiner* — J. Woodrow Eldred (57) ABSTRACT

A rapid air transportation system for humans, animals, materials or facilities, comprises of rapid coupling of a carriage on land to the tether of a hovering aircraft using quick coupling methods and rapid de-coupling of the same at the end of transportation and landing of the carriage, without landing the aircraft.

4 Claims, 7 Drawing Sheets

SECTION A-A

QUICK CONNECT-DISCONNECT AIR TRANSPORT

CROSS-REFERENCE TO RELATED APPLICATION

This application claims the benefit of provisional patent application Ser. No. 61/339,712, filed Mar. 9, 2010, confirmation number 6602.

FEDERALLY SPONSORED RESEARCH

Not applicable

SEQUENCE LISTING OR PROGRAM

Not Applicable

BACKGROUND OF THE INVENTION

1. Field of Invention

This invention relates to transportation of people, materials, medical facilities, etc. by connecting quickly a gondola or a similar carriage, to a hovering aircraft having a tether, by means of 'quick connect/disconnect' coupling. At the end of a one way transportation of the gondola, it is required to land only the gondola, and then it can be quickly disconnected, so that another gondola, if it is in waiting, the hovering aircraft can be moved over it and it can be quickly connected for its transportation.

2. Prior Art

Mass transport of objects such as materials, animals and humans is primarily carried out by trains, planes, trucks, buses, and large automobiles depending on the type and the requirement of the load. In instances where feasible and desired, boats and ships of various sizes are also used. In the urban settings with today's crowds, both in developed and developing countries, the existing commuter transportation systems pose many problems and limitations:

1. Transportation systems at ground use excessive amounts of fossil fuel,
2. All ground transportation causes wear and tear of the infrastructure on the ground,
3. At peak hours, the transportation is very slow and full of gridlocks,
4. Existing transportation systems have a certain adverse effects on the psyche and physique of humans,
5. The carbon emissions and other pollutants are a major problem to health and environment,
6. The ever present traffic and the simultaneous requirement of ground repairs are at odds with each other,
7. Transport vehicles have to 'be waiting' during the loading and unloading of passengers or objects.
8. When rivers overflow or hurricanes and other storms hit the land, creating vast areas of flooded low water level regions with stranded people, the rescuing of people and their valuables en masse is a difficult task by any presently available means. Boats may not be able to reach the needed locations, and helicopters may not be able to land to take in stranded people and materials.
9. Medical facilities in rural areas are not only sparse, often they are sub-par. Also, qualified medical personnel tend to remain in urban areas. No effective transportation system exists for patients, medics or medical facilities.
10. In emergencies due to large accidents or in combat situations, the medical attention that is needed may be at an inconvenient distance away from the scene, and ground transportation system is time consuming.

OBJECTS AND ADVANTAGES

Accordingly, the objects and advantages of invention presented in this patent application using 'Quick Connec-Disconnect Air Transport' to overcome the disadvantages of present transportation system, are itemized below. The method involves a hovering aircraft, such as a helicopter having a tether attached to its underside, and a means to quickly attach a carriage (gondola) that can be transported and quickly detached after landing it, while maintaining the aircraft hovering.

(a) Ground based traffic is reduced,
(b) Travel times are minimized due to the rapid air speeds of helicopters,
(c) Repairs to any ground based infrastructure can be conveniently carried out with little interference from ground traffic,
(d) With reduction in automobile traffic, carbon related and other environmentally unfriendly gas emissions are reduced at ground level,
(e) Humans can be transported to various destinations while standing since most commuting times will be reduced to a few minutes,
(f) Package delivering companies can establish quicker delivery times and multiple hubs,
(g) A prepackaged ready to treat healthcare facility can be transported to a needed site routinely, such as distant towns,
(h) flight ready medical care facilities and patients can be shuttled as required between healthcare institutions and disaster sites.
(i) A helicopter will be able to lower a gondola even into the shallow waters of a flooded region so that stranded people may be rescued in large numbers.
(j) Many large remotely located airports will not be needed.

DRAWINGS

Figures

REFERENCE NUMERALS

10 Landing base of helicopter pad (protective perimeter fence not shown)
11 $1^{st}$ Quadrant for landing helicopter directly, without a connected load
11X Hole in quadrant, to land a 'helicopter only' with a tether
12 Vestibules for people to enter and exit
13 Helicopter hovering over $2^{nd}$ quadrant 13X Helicopter with a load at a distance, going away or approaching
14 Load at quadrant 2, just landed or ready for take off
15 Load at quadrant 3, recently landed and unloading passengers
16 Load at quadrant 4, either ready for next lift-off or ready for passengers
17 Typical passenger, headed toward the vestibule to exit
18 Quick connect/disconnect coupling between gondola and the tether
18G The coupling half on the gondola side
19 External attendant to handle the quick connect/disconnect coupling
20 Hatch door access for attendant inside gondola to connect/disconnect
21 Tractor to bring external attendant to any location to connect/disconnect
22 Tracks for Tractor
23 Pivoted boom positioned for external attendant to reach the coupling
24 Support foundation at ground level of the elevated helicopter pad
25 Elevator access column leading to helicopter pad
26 Person at ground level
27 Target circle marking on platform to aid gondola landing
28 Tether underneath helicopter, attached part of helicopter
31 Hook portion of coupling attached to the tether at helicopter
31A Hook's tip
32 Eyelet portion of coupling attached to the gondola
32A Sufficiently long opening in eyelet for hook's tip's entry/removal
40 Fork of coupling, on gondola side
41 Fork-insert of coupling, on helicopter's tether side
42 Spherical end of fork-insert
43 Shear key at fork's and insert's eyelets
44 Shear key's tether to secure key, against accidental dropping
45 Earlike protrusion to guard against self removal of shear key
46 Sufficiently elongated eyelet holes to remove shear key
47 Handle bar of shear key
50 Upper half of double hook type coupling, tether side
51 Lower half of double hook type coupling, gondola side
52 Spherical bearing at upper half of double hook type coupling
53 Hook, at upper half

DETAILED DESCRIPTION

Quick Connect-Disconnect Air Transport

In the following detailed explanation, the word gondola is used to describe an air liftable carriage (#14) designed to carry people. In other cases when a carriage may be used to transport materials, the word carriage may be used. A carriage may also be a fully equipped and transport ready medical facility, housed with needed medical personnel, to be quickly connected and transported by air. The words gondola and carriage, when referred to as the load of the helicopter, are interchangeable. Also, in describing the quick connect/disconnect couplings, the gondola side and helicopter side halves may be reversed in positionality.

The primary focus of this invention is on the method and process steps to achieve rapid air transportation of a gondola on ground, with quick connection between the gondola and a hovering helicopter (#13), and quick disconnection of the same after landing the gondola but not the helicopter. The connection/disconnection may be done manually by a person (#19) external to the gondola. The connection/disconnection may also be done manually by a person inside the gondola using the hatch door (#20).

The person external to the gondola (#19), can position self using the pivoted boom (#23) on the tractor (#21) at any position on the landing pad (#10) to reach a tether's coupling (#18), by moving the tractor on tracks (#22).

The secondary focus is on the design of the quick connect and disconnect coupling, so that the operations can be achieved rapidly (#18, and FIGS. 2, 3, 3A, 3B, 3C, 3D,3E, 4, 4A). The gondolas in $3^{rd}$ and $4^{th}$ quadrants have shown on them their side of coupling halves (#18G).

The hanging tether (#28) is a part of the helicopter (#13). The quick connect/disconnect coupling (#18) has two distinct portions. One is attached to the roof side of the gondola; the other is attached to the bottom of the helicopter's tether.

The coupling is designed to handle sway in all directions and rotation about a vertical axis, both features being necessary to withstand wind and flight velocity conditions.

In manual operation for connecting the two parts of the coupling, the helicopter moves so as to position its tether (#28) as accurately as possible, close to the coupling half on the gondola. The attendant grabs either the tether directly, or a secondary tether off of the primary tether. Using the secondary tether, the attendant may pull the primary tether (#28) and its coupling half into position to make the connection. The secondary tether is not illustrated in the figures.

Figure 1:
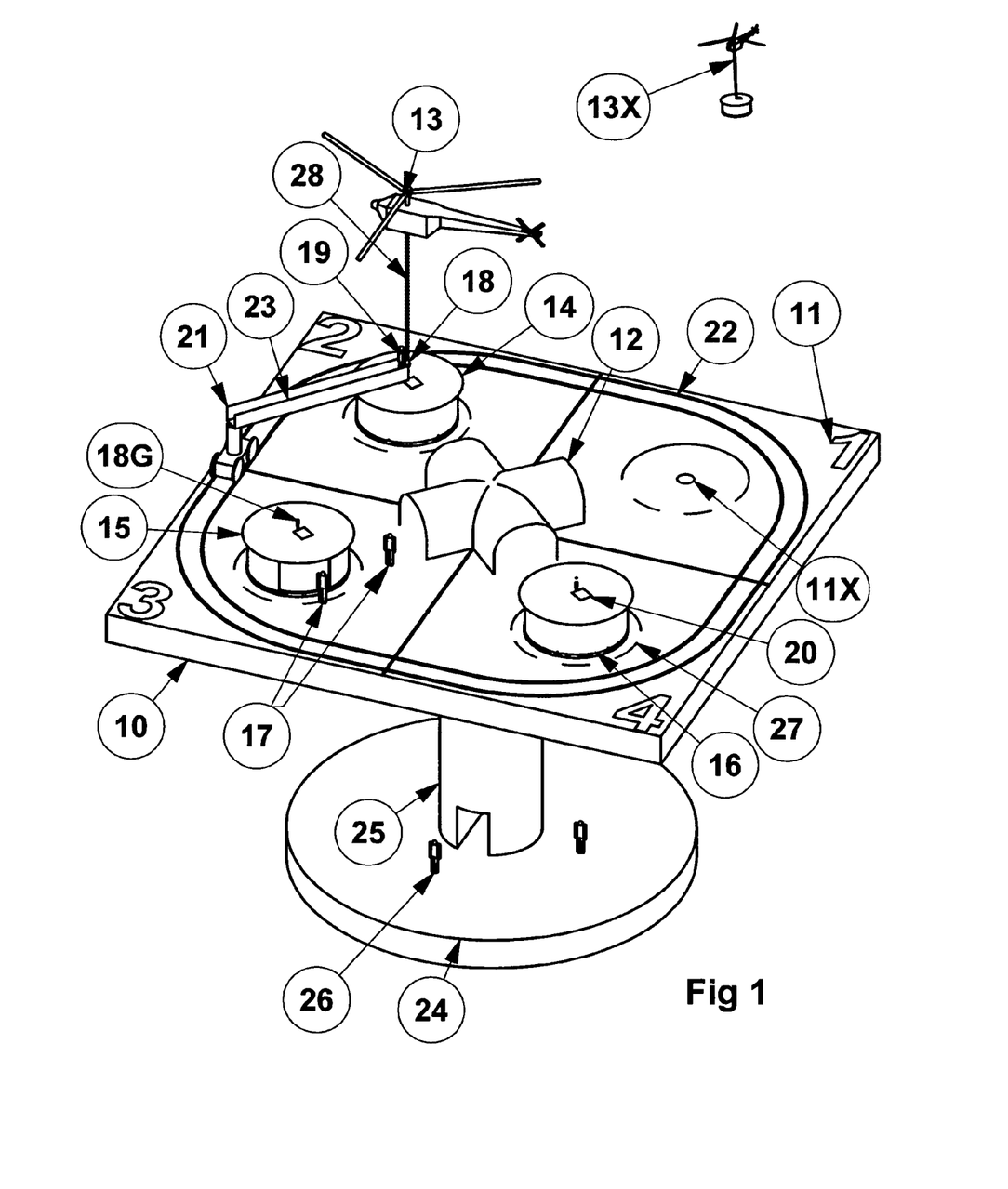
FIG. 1 Elevated helicopter pad having four landing quadrants

FIG. 1 shows an elevated square shaped helicopter landing and takeoff site, having four landing quadrants. Preferably one of the landing quadrants (#11) is reserved for emergency landing, or landing a helicopter by itself without a tethered gondola. The other three quadrants may be normal landing and take off positions of gondolas with passengers (#s 14, 15, and 16). (#11X is a hole in each of the landing quadrants to accommodate the hanging tether (#28) of a helicopter when the helicopter is landing by itself.

Referring to FIG. 1, #10 represents the helicopter pad built above ground level, with a pedestal (#24) as the foundation at ground level. Both are connected with an elevator column (#25) to handle personnel and passengers. At the top of the helicopter pad, is a security zone with connecting vestibules (#12) directing people to and from the landing quadrants. Each one of the three quadrants $2^{nd}$, $3^{rd}$, and $4^{th}$, are meant for routine landing and take off of gondolas. At any given instant during busy arrival and departure periods, one quadrant (in the illustration, $2^{nd}$) is being used for imminent arrival or departure of a gondola loaded with passengers, another quadrant ($4^{th}$ in the illustration) is for a gondola loaded with passengers and ready for quick coupling and takeoff or for an empty gondola ready for occupation, and the last quadrant ($3^{rd}$ in the illustration) is for a gondola that arrived recently and is being unloaded of its passengers. At any given instant a single helicopter may bring in a gondola with passengers; upon landing the gondola, its tether may be quickly decoupled (ref. #s 18, 19, 21, and 23); then the helicopter shuttles over to the gondola that is ready for take off, and its tether can be quickly coupled for take off. When the coupling is handled externally of the gondola, an attendant (#19) on the pivoted boom (#23) of a carriage (#21) handles the required functions. The carriage on peripheral tracks (#22) can travel in a beltway type loop to reach any helicopter on the helicopter pad. If the functions of connecting/disconnecting are to be handled by an attendant internal to the gondola, a roof hatch access (#20) is used.

When a gondola is safely out of the way from the landing and take off zone, another helicopter can bring in its gondola laden with passengers (#13X), and the process can repeat. During the interim times of landing, and takeoff of gondolas, another landed gondola is loaded with passengers readying it for takeoff.

Figure 2:
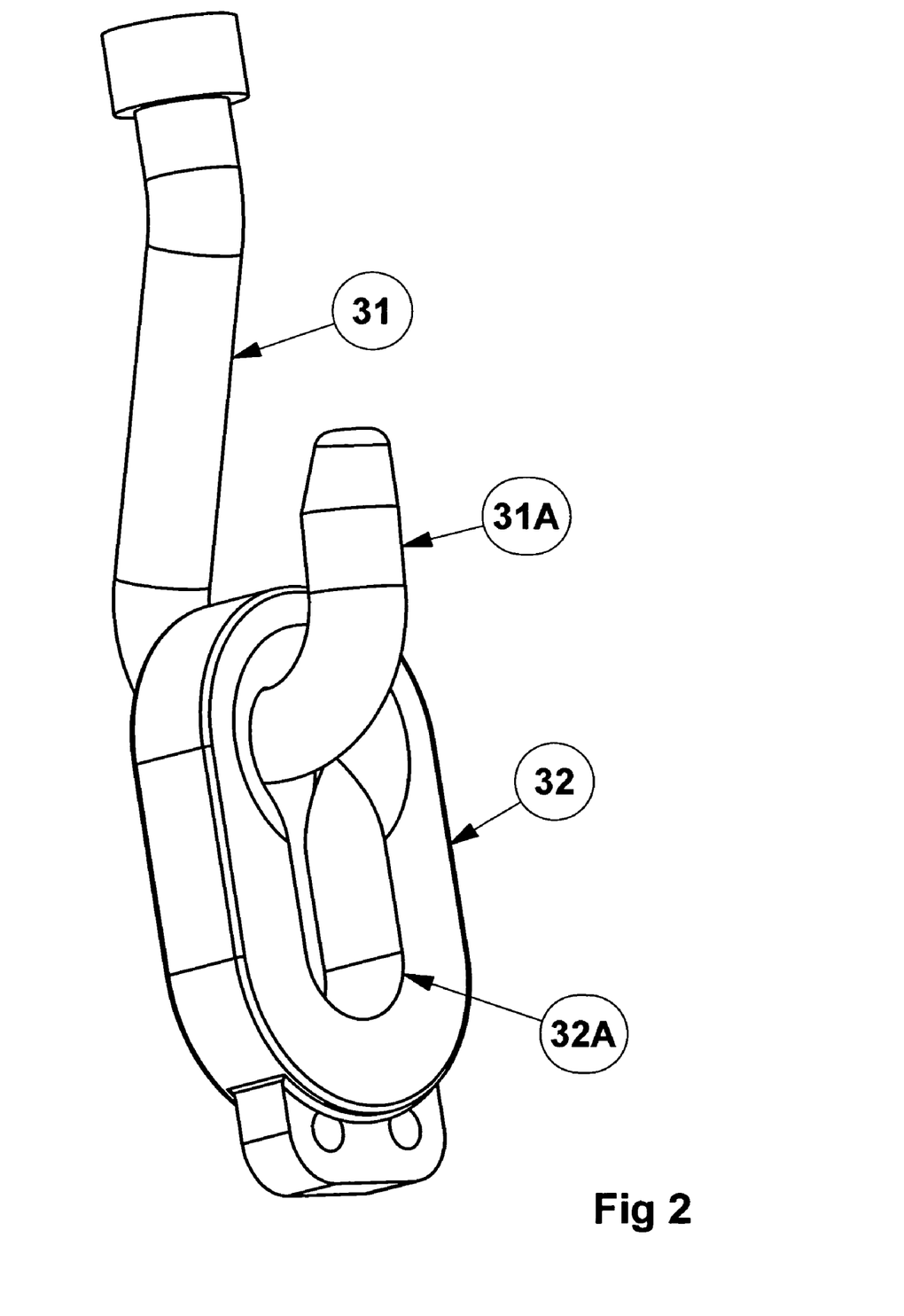
FIG. 2 Simple hook and eyelet as quick connect/disconnect coupling

FIG. 2 shows a simplest hook (#31) and eyelet (#32) coupler in coupled state. The hook's tip (#31A) is made sufficiently long for safe flight conditions, and the eyelet hole (#32A) is made tall enough for easy connection/disconnection.

The eyelet portion of the coupling may be replaced with another hook making the coupling with two hooks. The combined rotational ability of the coupling about a vertical axis and the swaying ability at the hook's contact with the eyelet will give the coupling sufficient swaying adaptability to wind and fight conditions.

Figure 3:
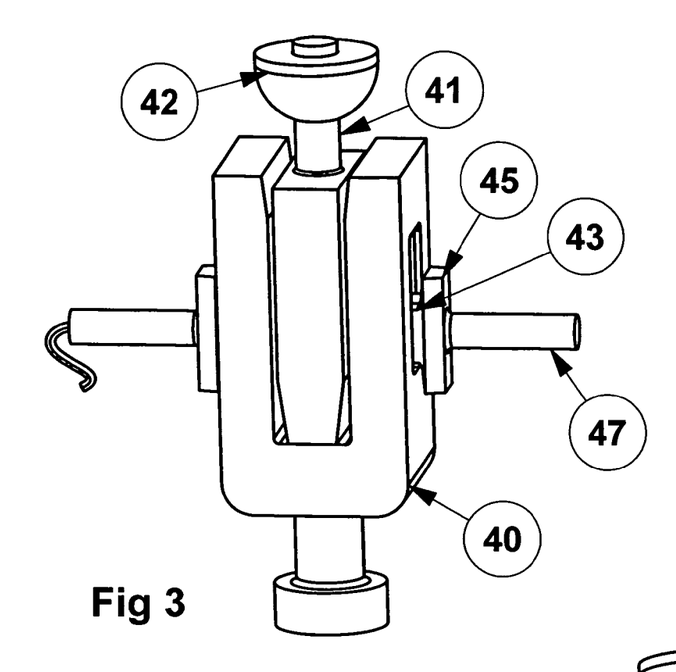
FIG. 3 Fork and insert coupling, as when gondola is on land
FIG. 3A Fork and insert coupling, as when gondola is in air
FIG. 3B Fork and insert coupling, top view
FIG. 3C Fork and insert coupling, section view, as when on land
FIG. 3D Shear key with rectangular cross section
FIG. 3E Shear key with round cross section
FIG. 4 Double hook type coupling, shown coupled, with partial cutout
FIG. 4A Double hook type coupling, shown uncoupled
Figure 3A:
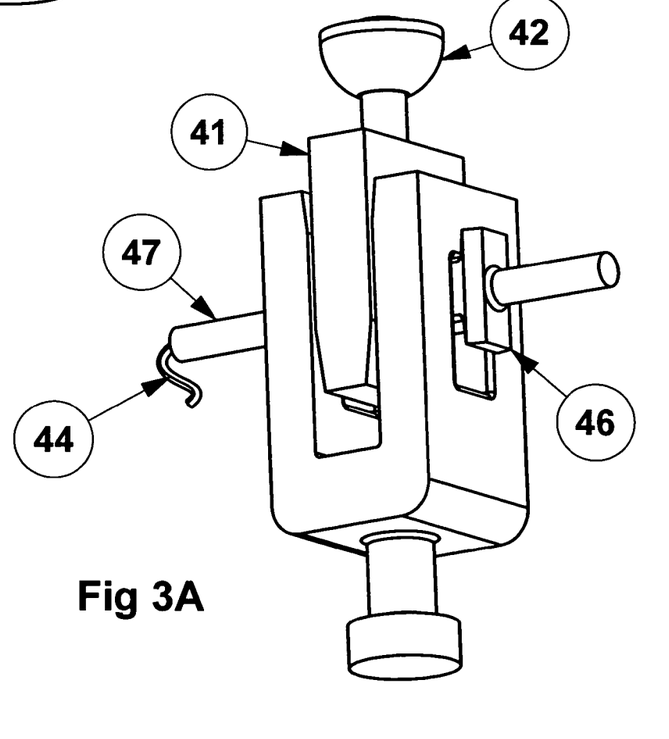
Figure 3B:
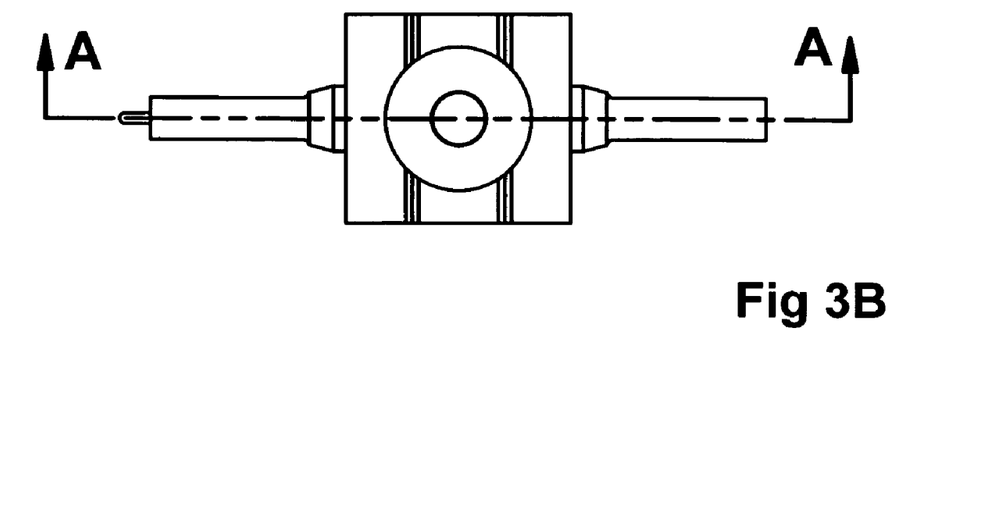
Figure 3C:
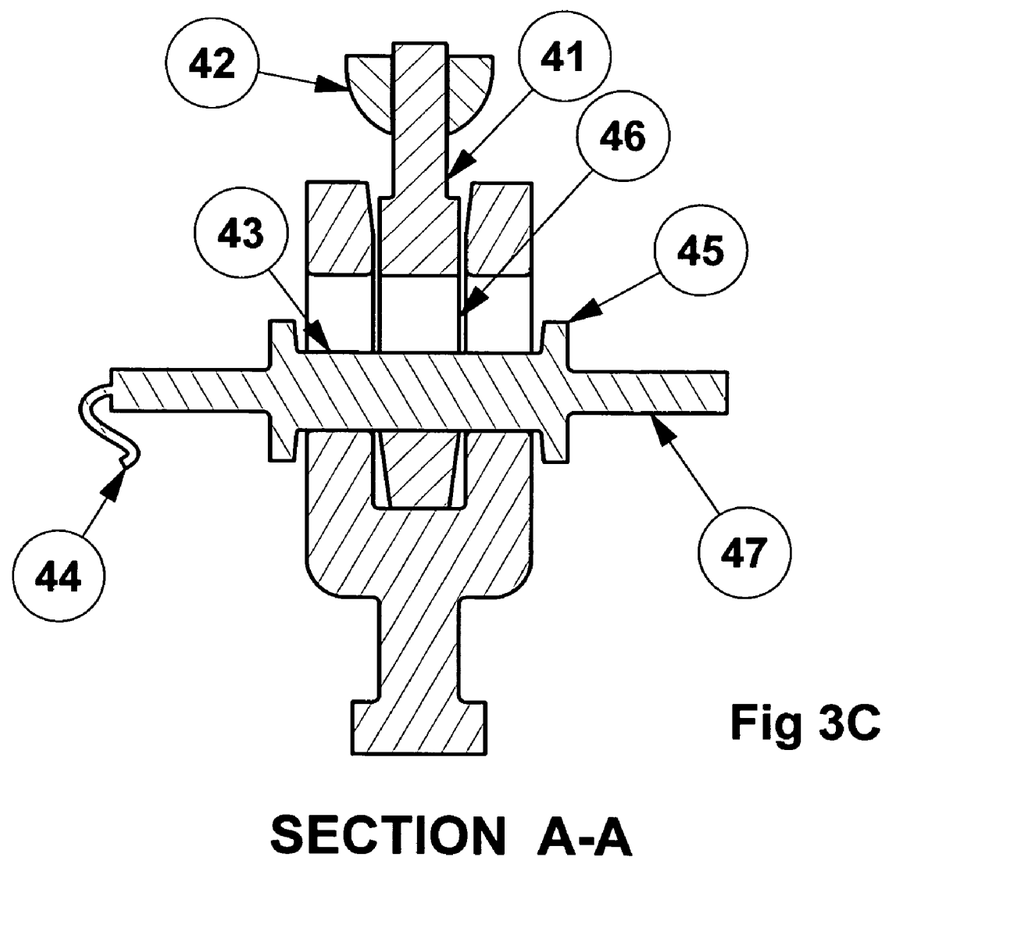
Figure 3D:
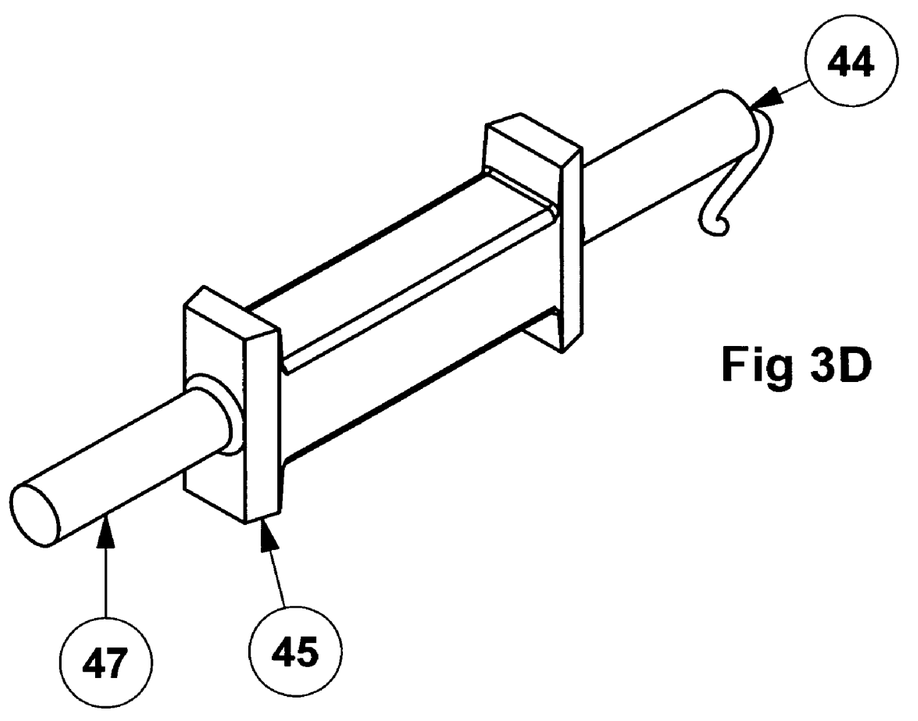
Figure 3E:
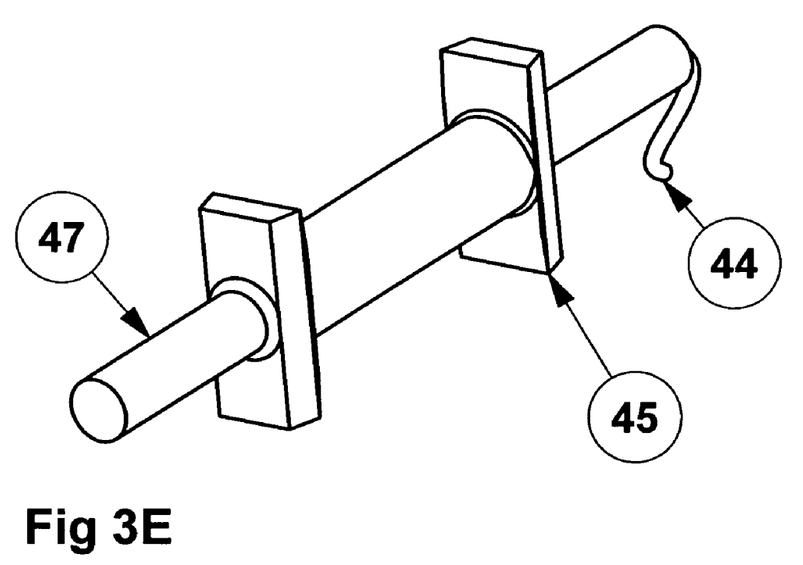

FIGS. 3, 3A, 3B, 3C show various views of a fork and fork insert coupling and a shear key. FIG. 3D shows a shear key having a rectangular cross section, and FIG. 3E shows a shear key having a round cross section The upper fork insert (#41) is inserted into the gap of the lower fork (#40) and then the shear key (#43) with handle bars (#47) is inserted horizontally from either side, through the eyelet holes (#46). The ears (#45) of the shear key, prevent it from working itself out, whether the gondola is on ground or up in air. The tether (#44) attached to the shear key may be attached to the roof side of the gondola, thus preventing any accidental drop of the key. Spherical bearing (#42) accommodates for sway during flight.

Figure 4:
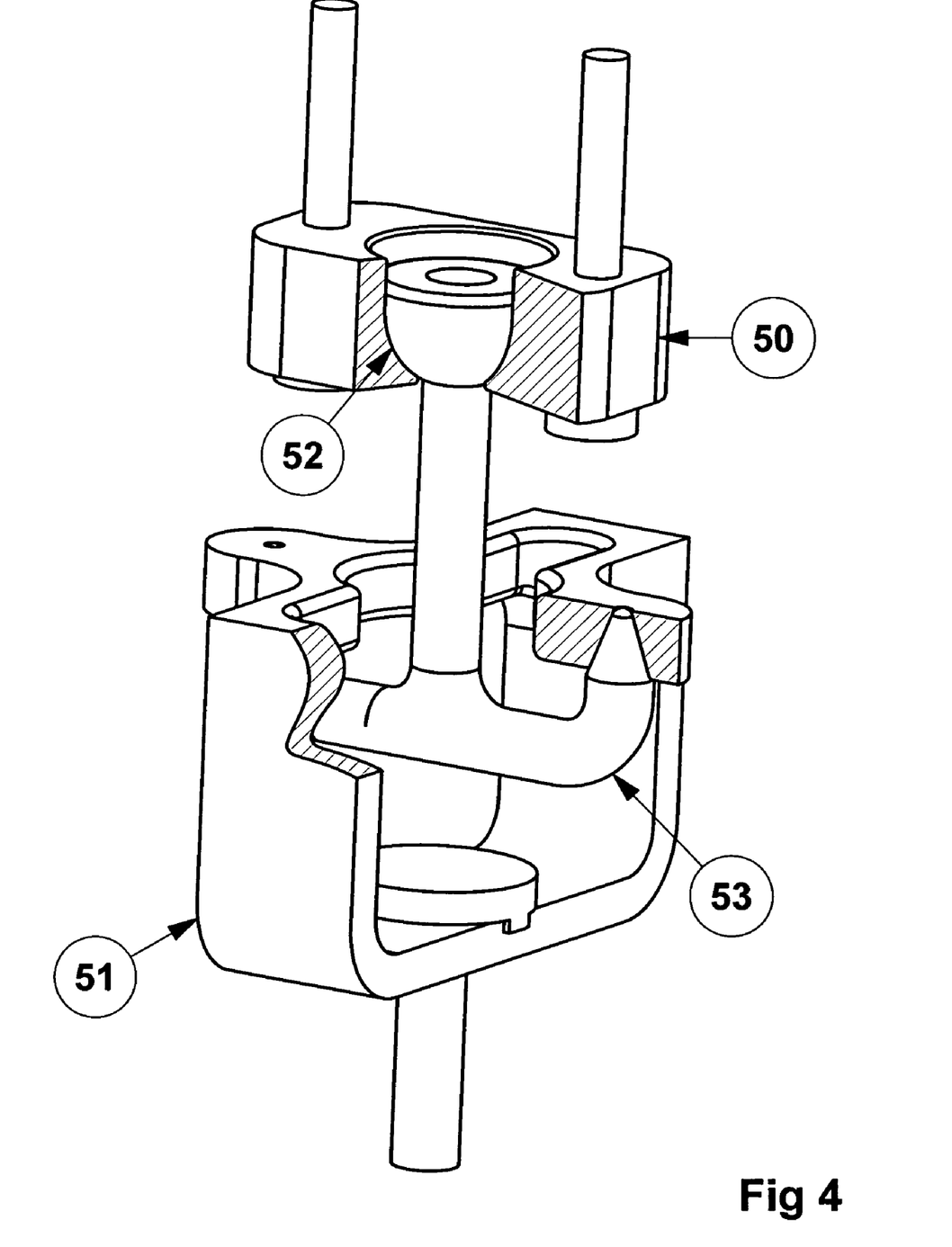
Figure 4A:
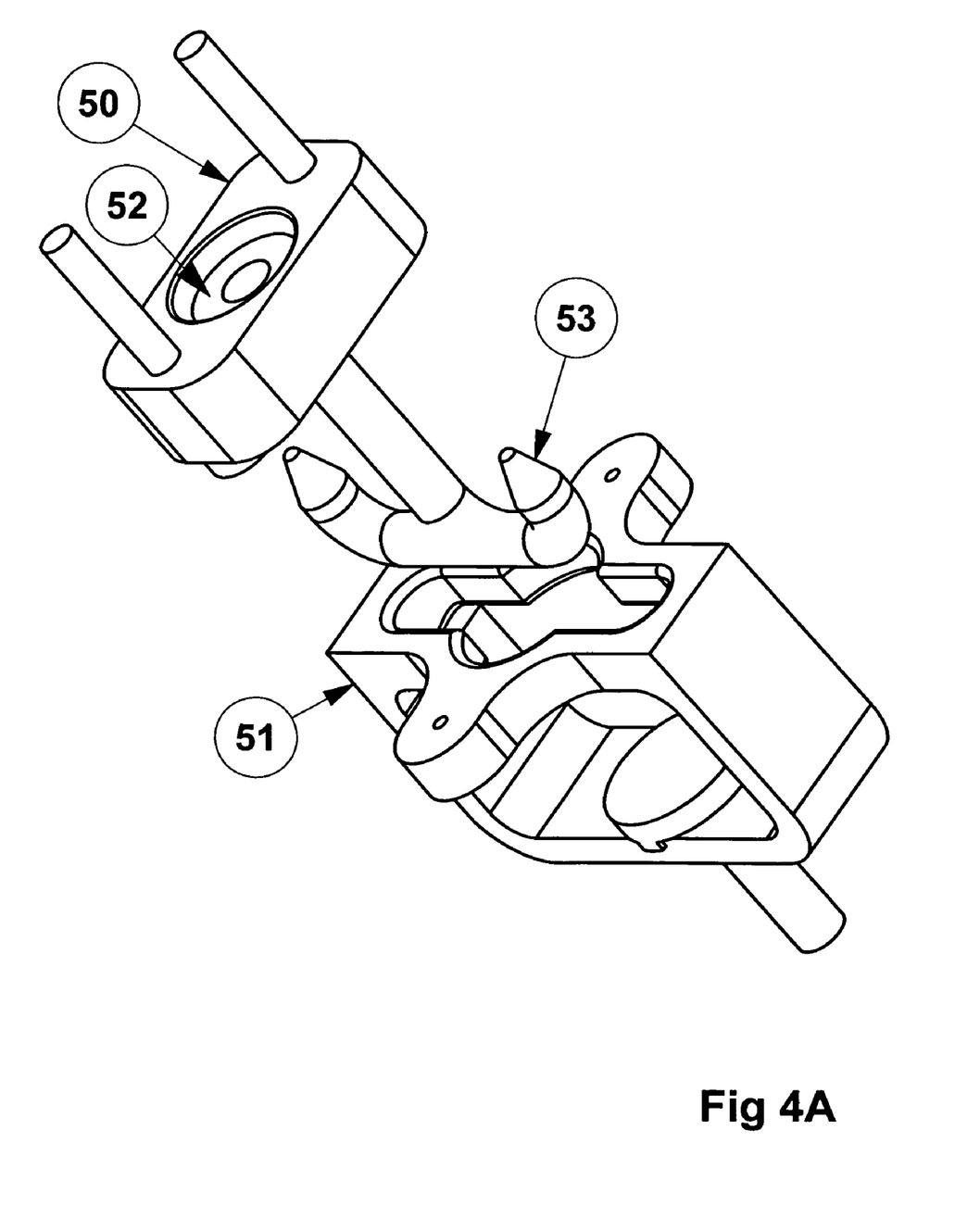

FIGS. 4 and 4A show a two hook coupling. Spherical bearing (#52) of the upper coupling half (#50) accommodates for sway during flight. Hooks (#53) are oriented as shown in FIG. 4A, before insertion into lower coupling half (#51). After insertion and a 90 degree relative turn between the coupling halves, the hook tips securely enter sockets as shown at the cut away view of FIG. 4.

CONCLUSIONS, RAMIFICATIONS, AND SCOPE

Accordingly the reader will see that with the invention presented, 'Quick Connect—Disconnect Air transport' with a helicopter having a tether, a travel ready carriage, and a coupler between the two, rapid transportation system for large number of passengers or materials in short durations of time, can be developed.

With various strategically placed transportation hubs developed, economic and efficient movement of people as well as materials in relay form, even over long distances, may be achieved.

I claim:

1. A connecting apparatus, between a hovering aircraft and a load external to said aircraft, comprising:
    (i) an external item, substantially shaped resembling the capital alphabet u, said external item comprising through said external item's thickness, one vertically elongated horizontal through opening, in each one of the two vertical members of said external item, wherein said openings are substantially horizontally aligned, and substantially equal in size, and oriented left to right, and further wherein said thickness of said external item refers to the dimension of said external item perpendicular to said u shape, and
    (ii) a substantially long vertical internal item, said internal item comprising a vertically elongated horizontal through opening, oriented left to right through the thickness of said internal item, wherein said thickness of said internal item refers to the dimension perpendicular to said internal item's front, and further wherein said internal item is insertable in the vertical gap between said external item's vertical members in a manner that said opening of said internal item can be aligned with said openings of said external item, and
    (iii) a load transmitting item, wherein said load transmitting item is insertable substantially horizontally through said openings of said external item and said opening of said internal item, and further wherein the shape of said load transmitting item resembles the capital alphabet h, whereby, when said load transmitting item is inserted, said load transmitting item's vertical members in a longitudinally aligned orientation to said openings of said external item and said internal item, sequentially through one of said openings of said external item, followed through said opening of said internal item and further followed through the remaining opening of said external item, thus forming said connecting apparatus, with said load transmitting part's vertical members being external to the outside of said external item's vertical members, said load transmitting item is prevented from disassembling itself from said connecting apparatus.

2. In claim 1 said external item is an assembly of a plurality of parts.

3. In claim 1 said internal item is an assembly of a plurality of parts.

4. In claim 1 said load transmitting item is an assembly of plurality of parts.

\* \* \* \* \*